US010940828B2

(12) United States Patent
Cech et al.

(10) Patent No.: US 10,940,828 B2
(45) Date of Patent: Mar. 9, 2021

(54) DETECTION AND MONITORING OF OCCUPANT SEAT BELT

(71) Applicant: Joyson Safety Systems Acquisition LLC, Auburn Hills, MI (US)

(72) Inventors: Leonard Cech, Brighton, MI (US); Chakravarthi Mallikarjun Nagolu, Shelby Township, MI (US); Josh Ramaglia, Davison, MI (US); Salvatore Brauer, Goodrich, MI (US); Babak Bakhtiar, Richmond Hill (CA)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 16/840,974

(22) Filed: Apr. 6, 2020

(65) Prior Publication Data

US 2020/0298796 A1 Sep. 24, 2020

Related U.S. Application Data

(63) Continuation of application No. 15/980,628, filed on May 15, 2018, now Pat. No. 10,611,335.
(Continued)

(51) Int. Cl.
*B60R 22/48* (2006.01)
*B60Q 3/242* (2017.01)
(Continued)

(52) U.S. Cl.
CPC .............. *B60R 22/48* (2013.01); *B60Q 3/242* (2017.02); *B60R 21/01512* (2014.10);
(Continued)

(58) Field of Classification Search
USPC .......................................................... 348/46
See application file for complete search history.

(56) References Cited

U.S. PATENT DOCUMENTS

| 6,260,650 B1 * | 7/2001 | Gustavsson | B60K 28/04 |
| | | | 180/268 |
| 6,757,602 B2 * | 6/2004 | Breed | G01S 15/04 |
| | | | 180/268 |

(Continued)

FOREIGN PATENT DOCUMENTS

| DE | 102015113536 A1 | 3/2016 |
| DE | 102015120811 A1 | 6/2016 |

(Continued)

OTHER PUBLICATIONS

Korean Intellectual Property Office, International Search Report and Written Opinion, dated Sep. 18, 2018 of PCT/US2018/032826.
(Continued)

*Primary Examiner* — Behrooz M Senfi
(74) *Attorney, Agent, or Firm* — Meunier Carlin & Curfman LLC

(57) ABSTRACT

In one embodiment, a system of detecting seat belt operation in a vehicle includes at least one light source configured to emit a predetermined wavelength of light onto structures within the vehicle, wherein at least one of the structures is a passenger seat belt assembly having a pattern that reflects the predetermined wavelength at a preferred luminance. At least one 3-D time of flight camera is positioned in the vehicle to receive reflected light from the structures in the vehicle and provide images of the structures that distinguish the preferred luminance of the pattern from other structures in the vehicle. A computer processor connected to computer memory and the camera includes computer readable instructions causing the processor to reconstruct 3-D information in regard to respective images of the structures and calculate a depth measurement of the distance of the reflective pattern on the passenger seat belt assembly from the camera.

20 Claims, 20 Drawing Sheets

Related U.S. Application Data

(60) Provisional application No. 62/506,245, filed on May 15, 2017.

(51) Int. Cl.

| | | |
|---|---|---|
| *B60R 21/015* | (2006.01) | |
| *H04N 13/254* | (2018.01) | |
| *G06T 7/557* | (2017.01) | |
| *G06T 7/246* | (2017.01) | |
| *G06K 9/00* | (2006.01) | |
| *G06K 9/20* | (2006.01) | |
| *G01S 11/00* | (2006.01) | |
| *H04N 5/247* | (2006.01) | |

(52) U.S. Cl.
CPC .......... *G01S 11/00* (2013.01); *G06K 9/00838* (2013.01); *G06K 9/2018* (2013.01); *G06T 7/248* (2017.01); *G06T 7/557* (2017.01); *H04N 5/247* (2013.01); *H04N 13/254* (2018.05); *B60R 21/01544* (2014.10); *B60R 2022/485* (2013.01); *B60R 2022/4866* (2013.01); *G06T 2207/10028* (2013.01); *G06T 2207/30268* (2013.01)

(56) References Cited

U.S. PATENT DOCUMENTS

| 7,145,448 | B2  | 12/2006 | Tanaka et al. |
| 7,406,181 | B2* | 7/2008  | O'Boyle ............ G06K 9/00201 |
| | | | 382/104 |
| 7,513,524 | B2* | 4/2009  | Oota ........................ B60R 21/18 |
| | | | 280/733 |
| 8,036,795 | B2  | 10/2011 | Allen |
| 10,083,361 | B2* | 9/2018 | Schamp ............... B60G 17/019 |
| 10,611,335 | B2* | 4/2020 | Cech ....................... G01S 11/00 |
| 2005/0111700 | A1 | 5/2005 | O'Boyle et al. |
| 2005/0263992 | A1 | 12/2005 | Matsuda et al. |
| 2006/0180377 | A1 | 8/2006 | Hofbeck et al. |
| 2006/0208169 | A1 | 9/2006 | Breed et al. |
| 2007/0159531 | A1 | 7/2007 | Anderson |
| 2007/0195990 | A1 | 8/2007 | Levy |
| 2008/0296883 | A1 | 12/2008 | Burkhardtsmaier |
| 2012/0065843 | A1 | 3/2012 | Thomas et al. |
| 2014/0168441 | A1 | 6/2014 | Koike |
| 2015/0251618 | A1 | 9/2015 | Ghannam et al. |
| 2015/0283974 | A1 | 10/2015 | Schlittenbauer et al. |
| 2015/0379362 | A1 | 12/2015 | Calmes et al. |
| 2017/0196516 | A1 | 7/2017 | Matsumoto |
| 2018/0186321 | A1 | 7/2018 | Naghizadeh |
| 2019/0003877 | A1 | 1/2019 | Aina et al. |
| 2020/0320318 | A1* | 10/2020 | Ramaglia ........... G06K 9/00832 |

FOREIGN PATENT DOCUMENTS

| DE | 102015010421 A1 | 2/2017 |
| DE | 102018206777 A1 | 11/2019 |
| FR | 2877279 | 6/2008 |
| KR | 20-1999-0031337 | 7/1999 |
| WO | 2005007468 | 1/2005 |

OTHER PUBLICATIONS

Non-Final Office Action issued for U.S. Appl. No. 15/980,628, dated Jun. 26, 2019.

Notice of Allowance issued for U.S. Appl. No. 15/980,628, dated Nov. 25, 2019.

Office Action Issued in DE Application No. 11 2018 002 494.6; dated Jan. 5, 2021; 14 pages.

* cited by examiner

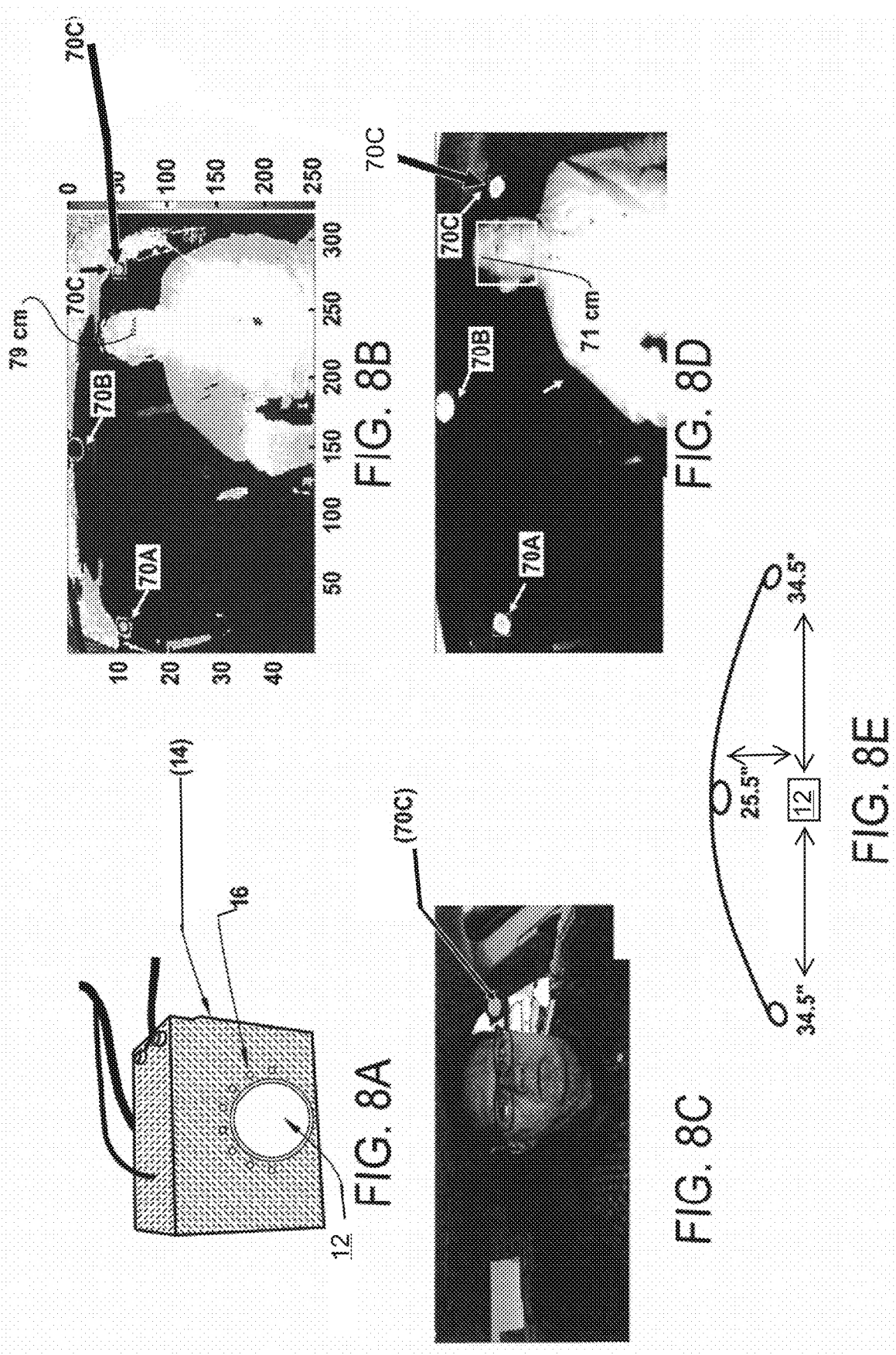

Intensity image (X,Y)

Seat Adjustment Range

Depth limits = ± d/2

DETECTION AND MONITORING OF OCCUPANT SEAT BELT

CROSS REFERENCE TO RELATED APPLICATIONS

This application claims priority to and incorporates entirely by reference U.S. Patent Application Ser. No. 62/506,245 filed on May 15, 2017, and entitled "Detection and Monitoring of Occupant Seat Belt."

TECHNICAL FIELD

The disclosure presented herein relates to imaging systems within a vehicle passenger cabin and is directed to locating, identifying, and highlighting seat belt assemblies therein to confirm seat belt use and seat belt positions for respective vehicle occupants.

BACKGROUND

Seat belts are standard equipment for almost every kind of vehicle in which occupants are transported in today's transportation systems. Not only are original equipment manufacturers (OEMs) required to meet strict standards for seat belt engineering and installation, but in many scenarios, vehicle occupants are required to wear seat belts as a matter of law. Even with manufacturing regulations and use laws in place, however, overall vehicle safety is entirely dependent upon vehicle occupants using seat belts properly. Visual inspection by outside authorities is not completely reliable given that a vehicle interior is only partially visible from outside of a vehicle. Individuals attempting to circumvent seat belt use laws also position seat belts inside a vehicle in a way that gives an appearance of seat belt use but allows the vehicle occupant more latitude in range of movement (i.e., fastening the seat belt behind the user's back or pulling the seat belt only partially across the user's body and manipulating the seat belt spool to maintain the seat belt in an extended position without requiring a fixed latching).

Seat belt misuse and/or unreliable seat belt monitoring may implicate issues other than simple bodily protection by restraining an occupant during an accident. Detection and tracking of occupant seat belt use has been primarily accomplished using on/off switches as sensors that transmit corresponding buckled/unbuckled data signals to a central processor as part of a vehicle control system data gathering operation. Sensor state from the seat belt switches can be used to determine restraint settings and used, for example, to determine air bag suppression or deployment decisions. Motorized seat belts may also use belt payout sensors and/or belt tension sensors, where these sensors can be used to detect and/or track proper belt placement as well as dynamic changes in the seat belt payout when the occupant is moving. Such sensors can be used to control restraint settings statically and/or dynamically.

Prior methods of seat belt monitoring can be effective but can also be spoofed. As noted above, individuals continue to engage in improper seat belt buckling behind or under the occupant, attaching buckle surrogates without using the seat belt, and maneuvering themselves out of the seat belt, particularly the shoulder strap, by hand. Furthermore, many rear seating locations do not currently use seatbelt switches, belt payout sensors, or belt tension sensors. It may be difficult to install the necessary electronics in adjustable and movable seating locations to support buckle switches, payout or tension sensors as aftermarket control hardware.

A need continues to exist in the vehicle market for control systems that monitor vehicle occupants for proper seat belt use and provide seat belt use and position data to the control system to enact additional safety precautions as discussed herein.

SUMMARY OF THE DISCLOSURE

In one embodiment, a system of detecting seat belt operation in a vehicle includes at least one light source configured to emit a predetermined wavelength of light onto structures within the vehicle, wherein at least one of the structures is a passenger seat belt assembly having a pattern that reflects the predetermined wavelength at a preferred luminance. At least one 3-D time of flight camera is positioned in the vehicle to receive reflected light from the structures in the vehicle and provide images of the structures that distinguish the preferred luminance of the pattern from other structures in the vehicle. A computer processor connected to computer memory and the camera, includes computer readable instructions causing the processor to reconstruct 3-D information in regard to respective images of the structures and calculate a depth measurement of the distance of the reflective pattern on the passenger seat belt assembly from the camera.

In another embodiment, the computer processor connected to computer memory and the camera has software enabling the processor to create respective images of the structures and lot the images in a coordinate system, wherein the computer readable instructions are further configured to use the coordinate system to measure selected angles between portions of the pattern on the passenger seat belt assembly and the other structures in the vehicle.

In a third embodiment, a seat belt system includes an image detector comprising a sensor tuned to a selected wavelength for capturing an image on the sensor. A computer processor connected to computer memory and the image detector is directed by computerized software instructions such that the processor receives the image and plots the image in a 3-D coordinate system. A seat belt assembly in the vehicle includes seat belt components that incorporate reflective patterns thereon, wherein the reflective patterns reflect light onto the sensor at the selected wavelength and with a luminance that distinguishes the reflective patterns in the image. The image detector has a field of view sufficient to capture an image of at least one vehicle occupant operating the seat belt assembly in the vehicle, and the computer readable instructions accessible by the processor adapt the 3-D information from the image for use by an occupant classification system. The seat belt system provides verifying measurements computed from the 3-D coordinate system in regard to the position of the reflective patterns, the verifying measurements being formatted for comparison with expected measurements according to previously established standards presented by a classified occupant utilizing the seat belt assembly.

In yet another embodiment, a system of evaluating seat belt assemblies installed in a vehicle includes at least one camera connected to a computer system and at least one light source that illuminates regions of interest within a vehicle, wherein at least one region of interest is within the at least one camera's field of view. At least one seat belt assembly is installed in the vehicle and positioned within the at least one camera field of view, and the seat belt assembly includes fixed components that are stationary in the vehicle and dynamic components that move within the vehicle, the fixed and dynamic components including respective patterns that each have a predetermined reflectivity. The computer system includes at least one processor connected to memory having computer implemented instructions thereon, and the computer is implemented with instructions configured to use the camera to generate at least one image of the at least one region of interest in the vehicle; identify at least one fixed component of the at least one seat belt assembly as a reference component within the image of the region of interest; calculate at least one reference measurement as the distance between the camera and an identified pattern in the image as reflected from the reference component; calculate respective spatial measurements of dynamic components of the seat belt assembly as captured in the image, wherein the respective spatial measurements of the dynamic components comprise distances between selected patterns reflected from the dynamic components as shown in the image and other structures within the vehicle also shown in the image; and compare the spatial measurements of the dynamic components of the seat belt assembly relative to the reference measurement to evaluate the seat belt assembly in the vehicle.

BRIEF DESCRIPTION OF THE FIGURES

FIG. 8A is a perspective view of a camera used for capturing a series of images illustrating an establishment of fixed reference points within a vehicle.

FIG. 8B is a schematic representation of a first captured view of a reference target within a vehicle interior as disclosed herein.

FIG. 8C is a 3-D image of a vehicle occupant and reference target shown schematically in FIG. 8B.

FIG. 8D is a reduced resolution 3-D image of a vehicle occupant and a series of reference targets positioned within a vehicle interior.

FIG. 8E is a schematic representation of a measuring and positioning function enabled by a vehicle camera as disclosed herein.

DETAILED WRITTEN DESCRIPTION

Overview

Figure 1:
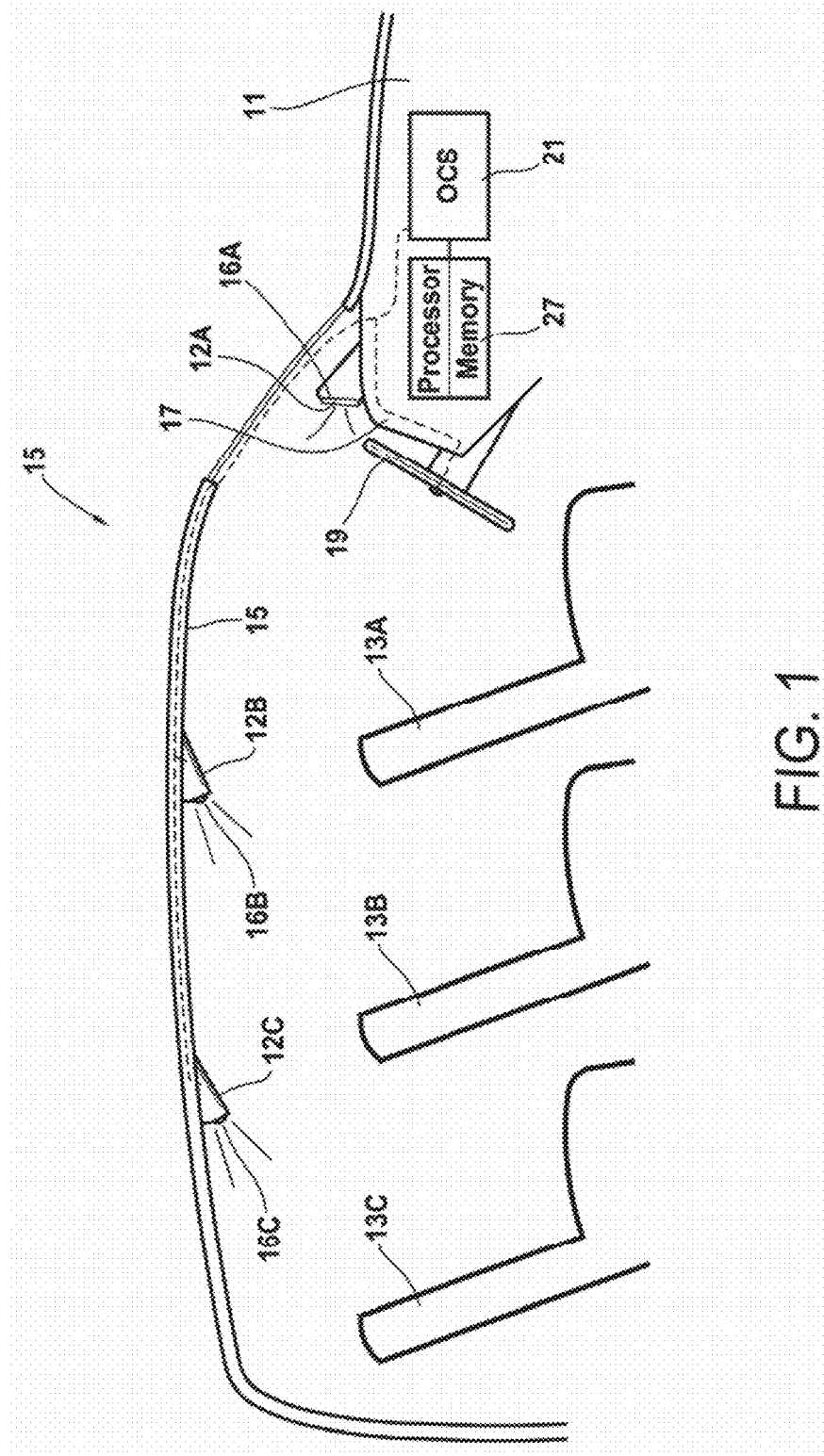
FIG. 1 is a plan view of a vehicle interior having seats installed within respective fields of view of cameras in the vehicle.

This disclosure uses electromagnetic sensor(s) to detect positions of numerous components of a seat belt assembly and track seat belt use within a vehicle. In one embodiment, the sensor is an active optical 3-D time of flight imaging system which emits a known waveform (e.g. sinusoidal, pseudo-random, and the like) of electromagnetic wavelength (s) of light which are collocated and/or synchronized with a 2-D imager detector array where the amplitude of the detected signal is proportional to the reflected light at the light wavelength(s). Using well known techniques, such a sensor can collect both the reflected light intensity of surfaces in the field of view of the imager and the distance of the surface from the imager detector.

The light is emitted and hits the surface of all objects within a line of site. As a function of the geometric arrangement and compositional materials of the object, a portion of the light is reflected back towards an imager detector array. Signal processing of the detected signals can be used to reconstruct 3-D information (intensity image and depth image) which can be used in machine vision algorithms to detect, and/or classify, and/or track information about the objects within the scene. In one non-limiting example embodiment, the light source wavelength may be selected as 950 nm, and the source of the selected light could be an LED array or VCSEL laser(s) with dispersion/filtering optics to disperse light within a known spatial area. Without limiting this disclosure to one kind of equipment set-up, the imager array may be, for example, a silicon multi-pixel array synchronized and sensitive to the above described 950 nm light emitted from a corresponding light source. However, the sensor and associated sources and detectors could also be based on other electromagnetic methods such as passive optical imagers (2-D, using ambient lighting) radar, ultrasonic, microwave, and numerous detection technologies.

In example embodiments, the seat belt material and/or the mechanical mounting of the seat belts (e.g. seat belt payout aperture) and/or mechanical features on the seat belt (e.g. d-rings, retention buttons, etc.) are composed of materials and/or augmented with an appropriate pattern such that features within the pattern have a controlled, deterministic reflectivity in the sensor wavelength region(s). For example, the seatbelt material can be coated (or sewn) with an interchanging pattern of high and low reflectivity materials (712) at the selected sensor wavelength(s). The pattern can be selected to provide improved ability to detect and track information about the seat belt by either visual inspection or by image detection in an automated computer vision system. Machine vision methods can be optimized to detect, classify and track these patterns. Pattern features may be selected for optimal contrast to detect/track extent of seat belt payout, depth of seat belt, and other comparative data sets, such as which belt position is in a closest position to camera (e.g., to identify the occupant's chest). Embodiments described herein detect, monitor, and/or track seat belt payout apertures and seat belt patterns, wherever located in an image created from a camera field of view. For example, these patterns can be located in seats, on roofs or in vehicle side structures to detect positions of seat belts or portions thereof relative to occupant body anatomy (e.g., shoulder/head).

In cases where the belt may be obscured by occupant appendages, objects brought into a vehicle by the occupant, such as clothing, blankets, luggage, cargo, or anything that the occupant places over an expected area for a seat belt can be accounted for in this system. The system and methods described herein identify reference points within a space that are significantly less likely to be obscured in a vehicle, providing known structures from which to evaluate seat belt use and operation. By identifying reference structures that are always visible within a vehicle, the system and methods disclosed herein take advantage of partially visible portions of a seat belt assembly, along with occupant classification methods, to predict proper or improper seat belt use. The detailed description below explains more embodiments of the methods and systems for seat belt monitoring in accordance with the figures referenced therein.

FIG. 1 is an overview schematic of a vehicle according to this disclosure including rows of seats (13A, 13B, 13C) within the interior (10), or cabin, of a vehicle. The term "vehicle" as used herein includes all of the broadest plain meanings for the term within the context of transportation (i.e., any references to an automobile are for example purposes only and do not limit this disclosure to any one embodiment). The vehicle of FIG. 1 incorporates a driver' seat (13A) adjacent a steering wheel (19) and a common driver's control panel (17) (possibly including a viewing screen). The vehicle control system is not shown separately but would include processors, memory, electronic circuits, and sensor necessary to establish a safe driving environment in the vehicle interior (10). The computers (27) in the vehicle may communicate with occupant classification systems (21) used to determine the entry/exit location anatomy, age, adult/child/infant status, and other quantitative characteristics of each occupant in the vehicle. The vehicle of FIG. 1 would typically include standard OEM equipment such as seat belt assemblies shown in more detail in other figures. The vehicle of FIG. 1, however, illustrates installation of cameras (12A, 12B, 12C) having respective light sources and positioned in the vehicle interior (10) to establish respective fields of view of occupants, seats (13), seat belt assemblies (20A, 20B), and other structures in the vehicle. In this non-limiting example, the cameras/image sensors (12) have been installed on the ceiling (15) of the vehicle and atop the driver's control panel (17). The vehicle includes the associated circuitry to connect the cameras (12), light sources (16), and associated arrays/sensors (hereinafter "image sensors" (14)) to a vehicle control system operating via a computer bank (11).

Figure 2:
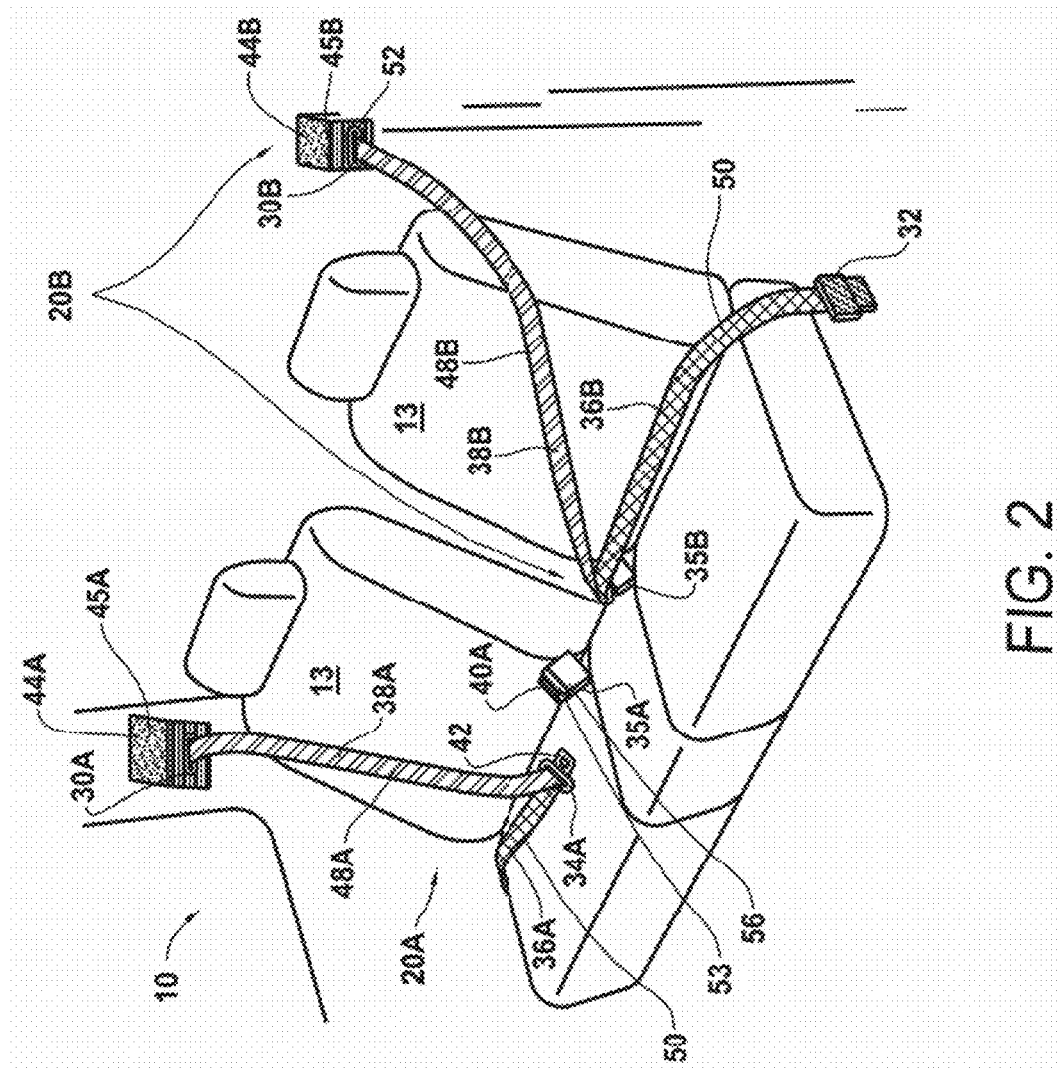
FIG. 2 is a perspective view of a seat belt assembly having reflective patterns thereon as described herein.

FIG. 2 illustrates more details about the vehicle interior (10) and the seats (13) with seat belt assemblies (20A, 20B) operating therein. One non-limiting aspect of this disclosure includes utilizing components of the seat belt assembly (20A, 20B) in a way that maximizes seat belt monitoring capabilities. The components may include, but are not limited to, a seat belt retractor assembly (i.e., a spool that unwinds and re-winds the seat belt into a webbing payout section (44)), a payout aperture (30) through which a seat belt extends, a portion of a seat belt assembly configured as a shoulder strap (48), a lap strap (36), a lap belt anchor (32), web length adjustment hardware (34), a buckle (40), buckle hardware (35), a seat belt tongue (42), at least one face (46) of the seat belt buckle (40), and peripheral hardware used to install or enable the seat belt assembly functions (e.g. d-rings, retention buttons). The term "seat belt hardware" is not intended to be limiting of this disclosure and includes any structure of the seat belt assembly that provides any kind of connection, installation, or operation function relative to the lap strap and shoulder strap shown in FIG. 2. At least these components may include patterns that are integral with, applied to, or manufactured with a respective component. The patterns are designed of materials having a known reflectivity such that the pattern is distinguishable in an intensity and/or distance image taken of the vehicle interior (10). A pattern having a pre-determined reflectivity due to its material composition shows up with a distinguishable luminance (or visible intensity) sufficient to distinguish the pattern from other structures in an image. The pattern may show up in an image as either a lower luminance region or a higher luminance region at the preference of the designer and continue to be useful for distinguishing components of the seat belt assembly. In FIG. 2, components of the seat belt assembly (20) show respective shoulder strap patterns (38), belt patterns (50), webbing payout section patterns (52), buckle aperture patterns (53), buckle pattern (56), and different patterns on opposite sides of components (i.e., opposite sides of the lap strap and shoulder strap having different patterns can identify a twisted position for a seat belt in an associated image.

Figure 6:
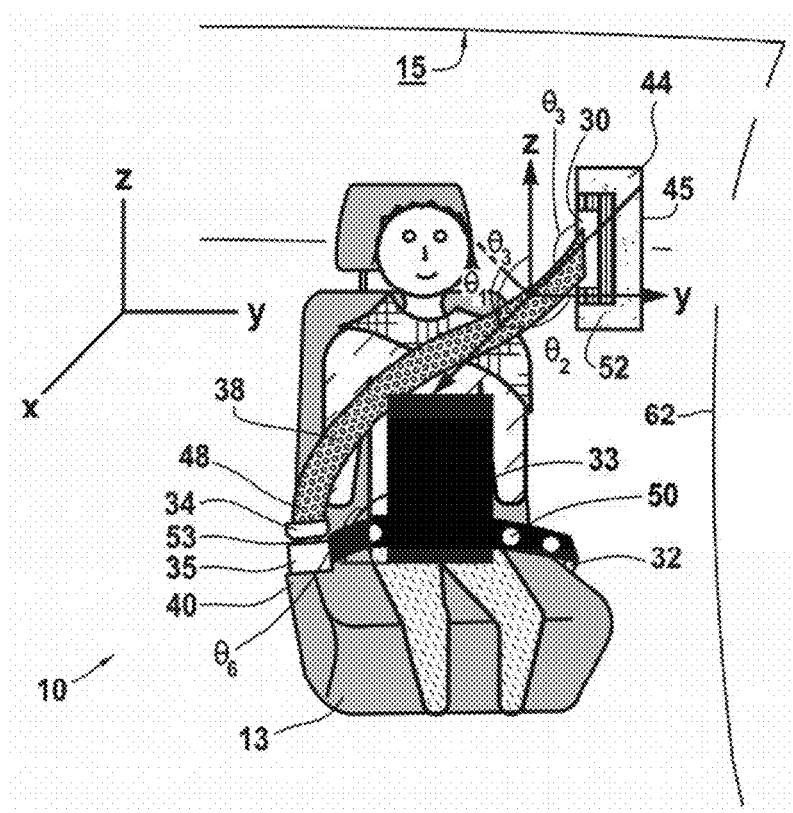
FIG. 6 is a portion of the image of FIG. 4 showing a visually obstructing item within the particular region of interest.
Figure 7B:
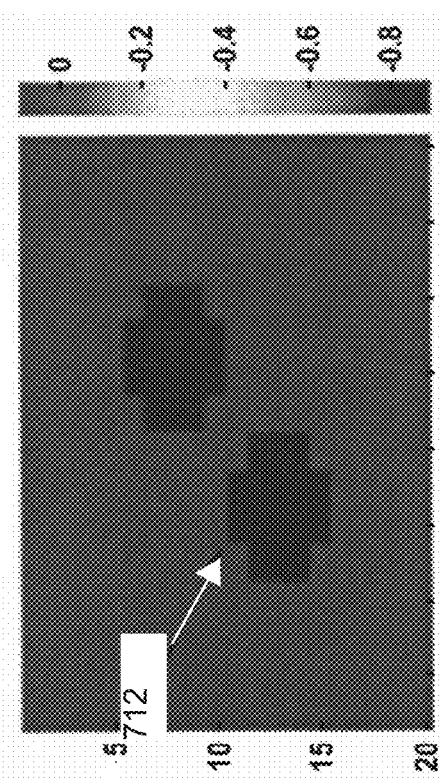
FIG. 7B is a schematic view of a selected seat belt pattern captured in the series of 3-D analysis screens of FIG. 7A.
Figure 7D:
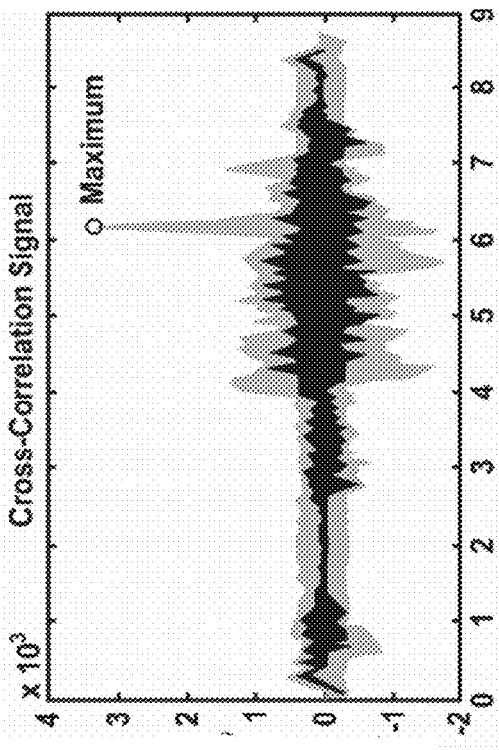
FIG. 7D is a schematic plot of a one-dimensional version of a cross correlation signal plotted from the two-dimensional image of FIG. 7C.
Figure 7A:
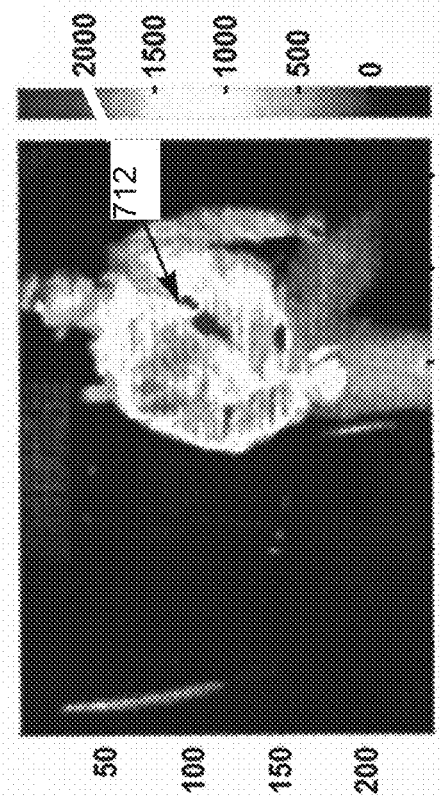
FIG. 7A is a perspective view of a vehicle interior captured as one of a series of 3-D image analysis screens provided by a computer associated with the system described herein.
Figure 7C:
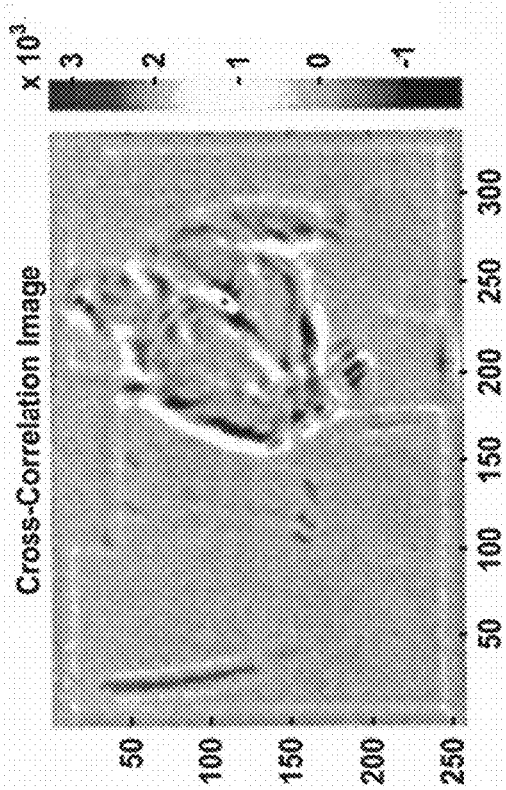
FIG. 7C is a schematic view of a two-dimensional cross-correlation image of a vehicle interior captured in the series of 3-D analysis screens of FIG. 7A.

FIG. 2 illustrates certain components that may be significantly visible at all times in the vehicle interior (10) even when an occupant or an occupant's belongings obscure other portions of the seat belt assembly from the camera field of view. For example, a webbing payout section (44) such as an area defined within a b pillar in a vehicle may be installed at multiple sites within the vehicle interior to provide a pay-out of an associated seat belt across an occupant. The retractor case and an associated payout aperture (30) would typically be visible to a properly positioned camera, even if the occupant holds an obscuring object (33) in the occupant's lap as illustrated in FIG. 6. Other kinds of components that are less likely to be hidden by cargo and usually visible within a camera's field of view include the seat belt buckle (40), which has a known range of motion.

Figure 3:
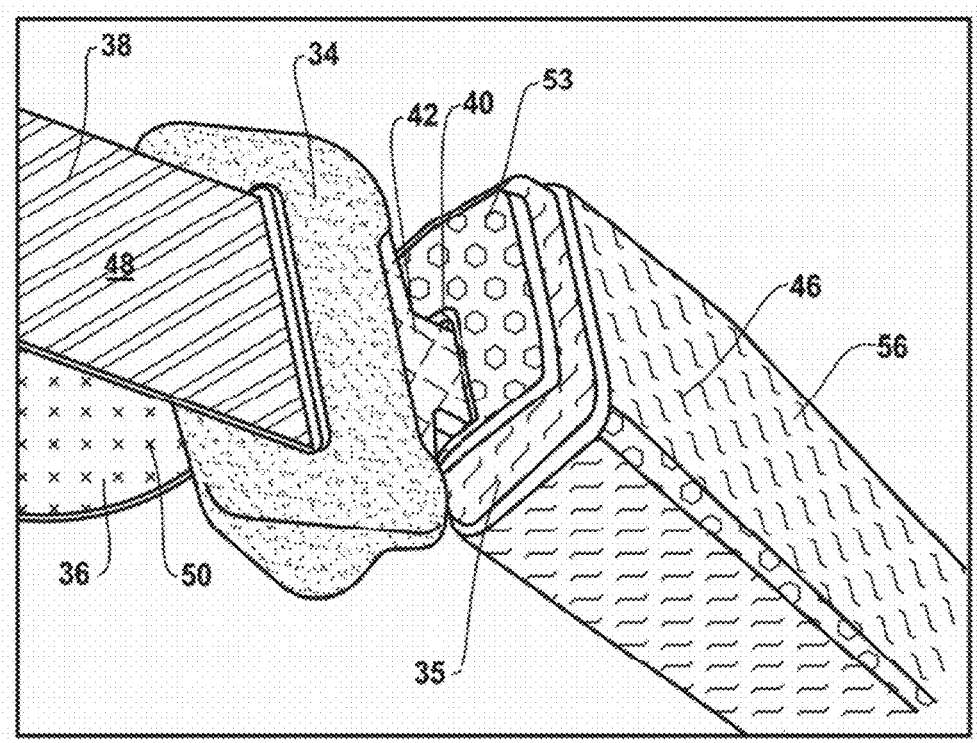
FIG. 3 is a perspective view of a seat belt buckle component in a buckled position with a seat belt tongue affixed thereto.

FIG. 3 illustrates a blown up view of a seat belt buckle having respective patterns on certain sub-components of the buckle component. For example, a shoulder strap (48) has a first shoulder strap pattern (38) on one side that can be identified as stripes and a second shoulder strap pattern (50) on an opposite side. In the example of FIG. 3, the opposite side of the shoulder strap is also visible as a lap belt pattern (50) for an associated lap strap (36). The buckle (40), the tongue (42), buckle faces (46), and web length adjustment hardware (34) are all viable candidates for having an identifiable pattern thereon.

Figure 4:
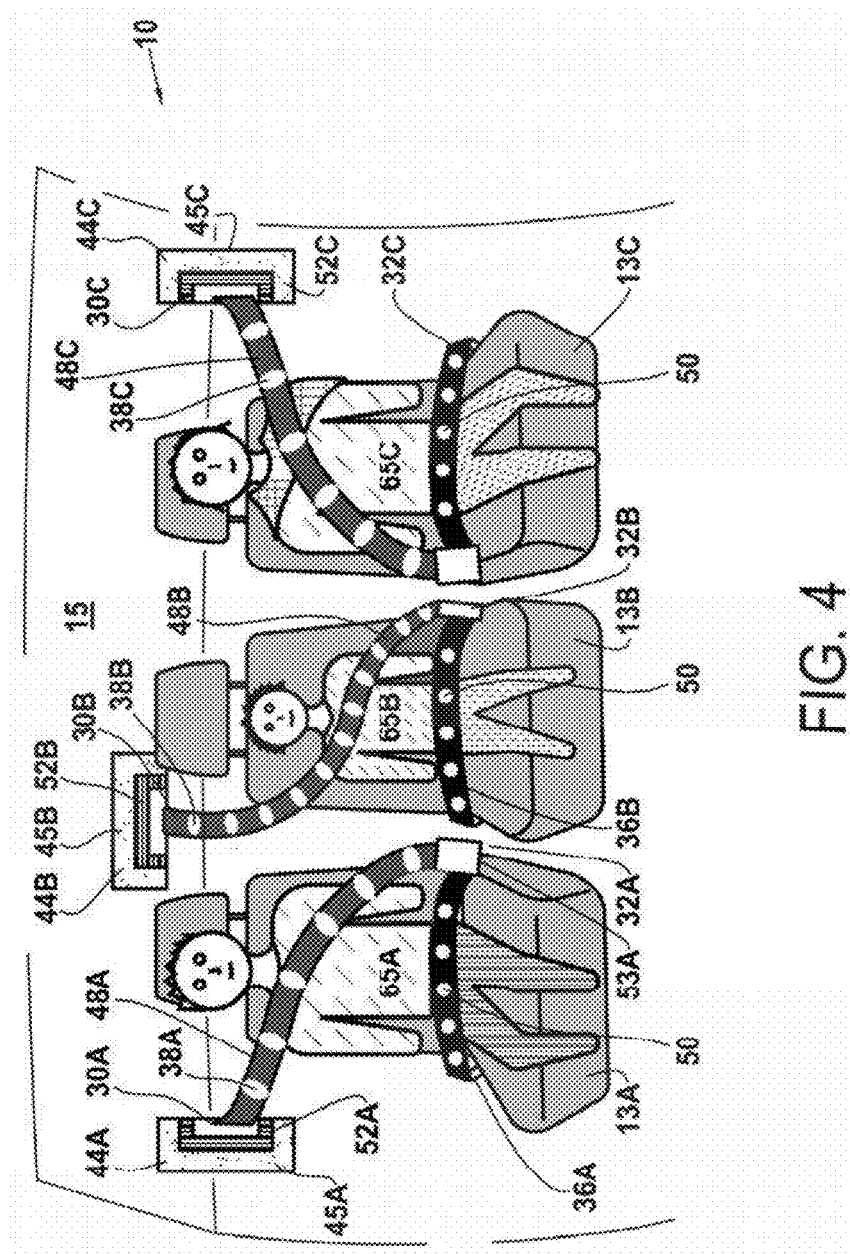
FIG. 4 is a representative 3-D image captured by the cameras of FIG. 1.

FIG. 4 shows one example embodiment of at least three seat belt assemblies (20) in use within a vehicle interior (10), and each seat belt assembly is operable with a respective seat (13A, 13B, 13C) having a different occupant therein. As would be true in most scenarios, the occupants are distinctive in both size, shape, and dimensions that can affect proper seat belt position for each occupant. The image of FIG. 4 illustrates an example of one kind of image (80) that a vehicle camera (12) (or an appropriate system of multiple cameras) can produce from a properly tuned light source (16) illuminating the vehicle interior (10) at a wavelength of electromagnetic radiation/light waves that has been selected to correspond to the capturing sensitivities and resolution of an image sensor (14) receiving reflected light back from materials and objects within the camera field of view. The image (80) may be either a two dimensional or three dimensional image, depending on the camera, the array, and the associated computer processors, but the patterns on the seat belts, anchor points, and retractors are visible therein. The payout aperture (30) within each webbing payout section (44) is illustrated with a significantly prominent pattern (52) outlining the aperture so that an origin of seat belt payout may be distinguishable in the image. The case (44) may have a different pattern (45) to further illuminate the structure of the retractor assembly. The remaining structures of FIG. 4 show the use of respective patterns on the seat belt assembly as discussed above. The components may include, but are not limited to, a seat belt retractor assembly (i.e., a spool that unwinds and re-winds the seat belt into a webbing payout section (44)), a payout aperture (30) through which a seat belt extends, a portion of a seat belt assembly configured as a shoulder strap (48), a lap strap (36), a lap belt anchor (32), web length adjustment hardware (34), a buckle (40), buckle hardware (35), a seat belt tongue (42), at least one face (46) of the seat belt buckle (40), and peripheral hardware used to install or enable the seat belt assembly functions (e.g. d-rings, retention buttons). A shoulder strap (48) has a first shoulder strap pattern (38) on one side that can be identified as stripes and a second shoulder strap pattern (50) on an opposite side. In the example of FIG. 3, the opposite side of the shoulder strap is also visible as a lap belt pattern (50) for an associated lap strap (36). The buckle (40), the tongue (42), buckle faces (46), and web length adjustment hardware (34) are all viable candidates for having an identifiable pattern thereon. The structures in the image and the associated patterns provide data to accomplish multiple functions—particularly classifying occupants pursuant to an associated occupant classification system ("OCS") (21), calculating spatial measurements relative to known references within the vehicle, and tracking movement within the vehicle. One goal is to identify that a lap strap and shoulder belt for the seat belt assembly cross an occupant at correct locations on the torso (65) to achieve a proper buckled/unbuckled state from sensors in the buckle.

The occupant classification system ("OCS") (21) may include numerous kinds of hardware, position sensors, pressure sensors, weight sensors, and the like to identify a vehicle occupant so that a vehicle meets regulatory requirements. Many traits of an occupant are currently identified by an OCS to assist in controlling air bag deployment as well as other restraint systems, alerts, and operational control signals. In non-limiting embodiments of this disclosure, images gathered pursuant to the methods and systems herein may be used in conjunction with an OCS to identify proper seat belt placement for many different levels of human development (e.g., adult, child, infant) as well as anatomy structures (large male, average male or female, small female). Optimal seat belt placement for these diverse occupants will be significantly different for each. An OCS may receive data from the computerized imaging systems described herein to conduct edge analyses to detect occupant forms, 3-D depth analyses for torso position, and anatomical dimensioning for seat belt confirmation relative to the occupant's body. Single camera and multi-camera systems for both seat belt monitoring and occupant classification are well within the scope of this disclosure.

Figure 5:
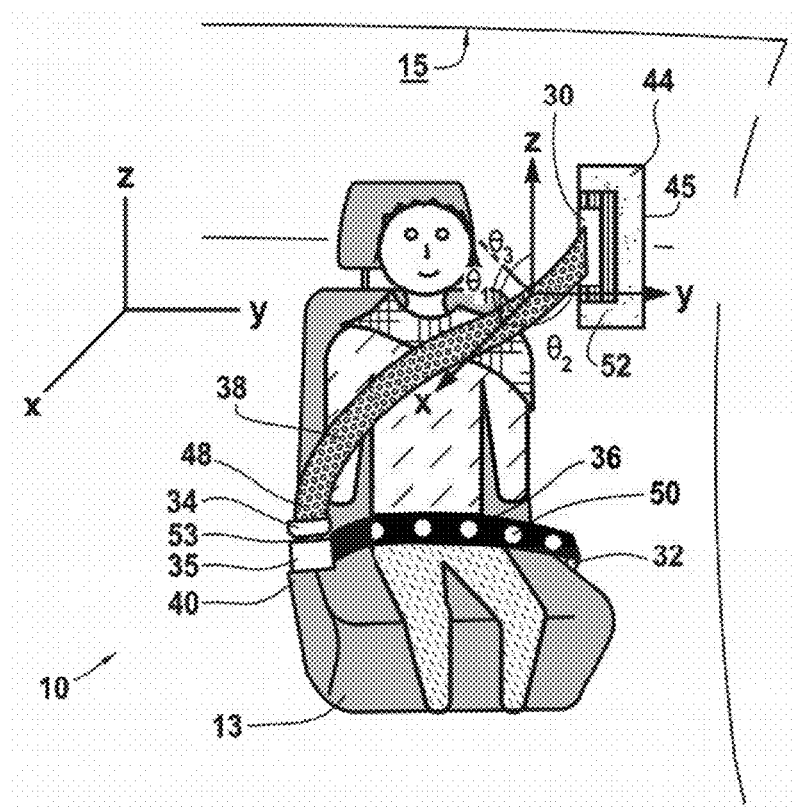
FIG. 5 is a portion of the image of FIG. 4 cropped for a particular region of interest.

FIGS. 5 and 6 illustrate an example of a three-dimensional analysis of a vehicle occupant in a vehicle seat (13) and utilizing the above noted components of the seat belt assembly (20). An image as shown may be constructed with sufficient levels of detail to distinguish patterns on numerous components of the seat belt assembly (such as the different patterns (48, 50) on the shoulder strap (38) and lap strap (36)). The components of the seat belt assembly as well as the occupant's body is shown with sufficient clarity to model the interior of the vehicle at this seat (i.e., at this region of interest) in a three dimensional coordinate system. Such mapping to a coordinate system allows for computer software to calculate spatial measurements for each frame of an image as well as tracking motion across pairs of images. In the non-limiting example of FIG. 5, a computerized method implemented by the system disclosed herein calculates numerous angles useful in identifying proper seat belt use or improper seat belt use. The spatial measurements may include distances from a camera (12) to a portion of the occupant's body (i.e., torso receiving a shoulder strap), distances between components of the seat belt assembly (20) and portions of the occupant's body, and angles between structures within the vehicle, the occupant's body, and the seat belt assembly. For example, without limiting this disclosure, FIG. 5 illustrates a method of calculating a first angle (Theta 1) between an occupant's shoulder and a longitudinal axis along the seat belt, a second angle (Theta 2) between the longitudinal axis of the seat belt and a referenced horizontal axis for the coordinate system, a third angle (Theta 3) calculated between a portion of the occupant's head and the longitudinal axis of the seat belt. These kinds of static measurements are mere examples of the system gathering data points to use in determining beginning, intermediate, and final positions of seat belt components in a respective vehicle. This data can then be used to prepare and issue associated alerts or warnings to the occupants, control air bags and other restraint systems, and update data to help an OCS verify classifications of occupants in the vehicle.

FIG. 6 illustrates the image of FIG. 5 with the addition of an obscuring object (33) placed in the lap of an occupant. The obscuring object may be a blanket, cargo, food, pets, or any item that hides a portion of the seat belt assembly from view in the image. In this scenario, the methods and systems disclosed herein use the above described spatial measurements and angles along with available views of the seat belt components that have not been obscured to predict seat belt position. The system may utilize additional angle measurements for components that are readily discernible in the image. One aspect of this disclosure includes preparing patterns of known reflectivity and luminance on seat belt components and other structures in the vehicle to provide numerous avenues of calculating seat belt position from areas that are most often unobstructed during use. For example, the payout aperture (30) and aperture pattern (52) would still be readily available in the image as shown in FIG. 6 to calculate Theta 5 as the angle between a webbing payout section (44) along an area of a b pillar of the vehicle and a seat belt payout exiting the payout aperture (30). Similarly, the angle (Theta 6) between a shoulder strap (48) and a lap strap (36) remains discernible along the buckle region (40) of the seat belt assembly. By associating the reflective patterns in strategic locations relative to cameras (12) installed in the vehicle interior (10), the system will gather sufficient image data from unobstructed regions to confirm seat belt use and placement.

FIG. 7 illustrates the kinds of analyses that are available with the apparatuses illustrated in FIGS. 2-4 and the pattern placement of FIGS. 5-6. The computer of this disclosure may be installed in the vehicle in a way that allows for the initial image of FIG. 7A to be compiled as a 3-D image and to provide extractable pattern data from a seat belt component as shown in FIG. 7B. Afterwards, both two dimensional and one-dimensional analyses of the spectrum, as reflected back to an image sensor used in the vehicle is available for data processing tools. FIG. 7 illustrates a cross correlation algorithm use to confirm an x, y, z position of a seat belt pattern across an occupant's chest.

Similarly, FIG. 8A shows another embodiment of a camera (12), utilizing infrared or near infrared light sources (16) to illuminate a vehicle interior (10) and provide reflective light signals back to a image sensor (14). In FIG. 8B, reference points within the vehicle have been identified as fixed reference apertures (70A, 70B, 70C) installed in fixed locations along the ceiling of a vehicle. A reference target (for example fixed reference aperture 70C) has been selected at a known distance from the camera imager and a known pixel location relative to the camera imager. This configuration sets up a way to utilize more sophisticated machine vision techniques, initially by calculating simple reference positions from the camera (12) to the fixed reference apertures (payout apertures having pre-determined pattern appliques) (70A, 70B, 70C) as shown in FIG. 8E.

Figure 9:
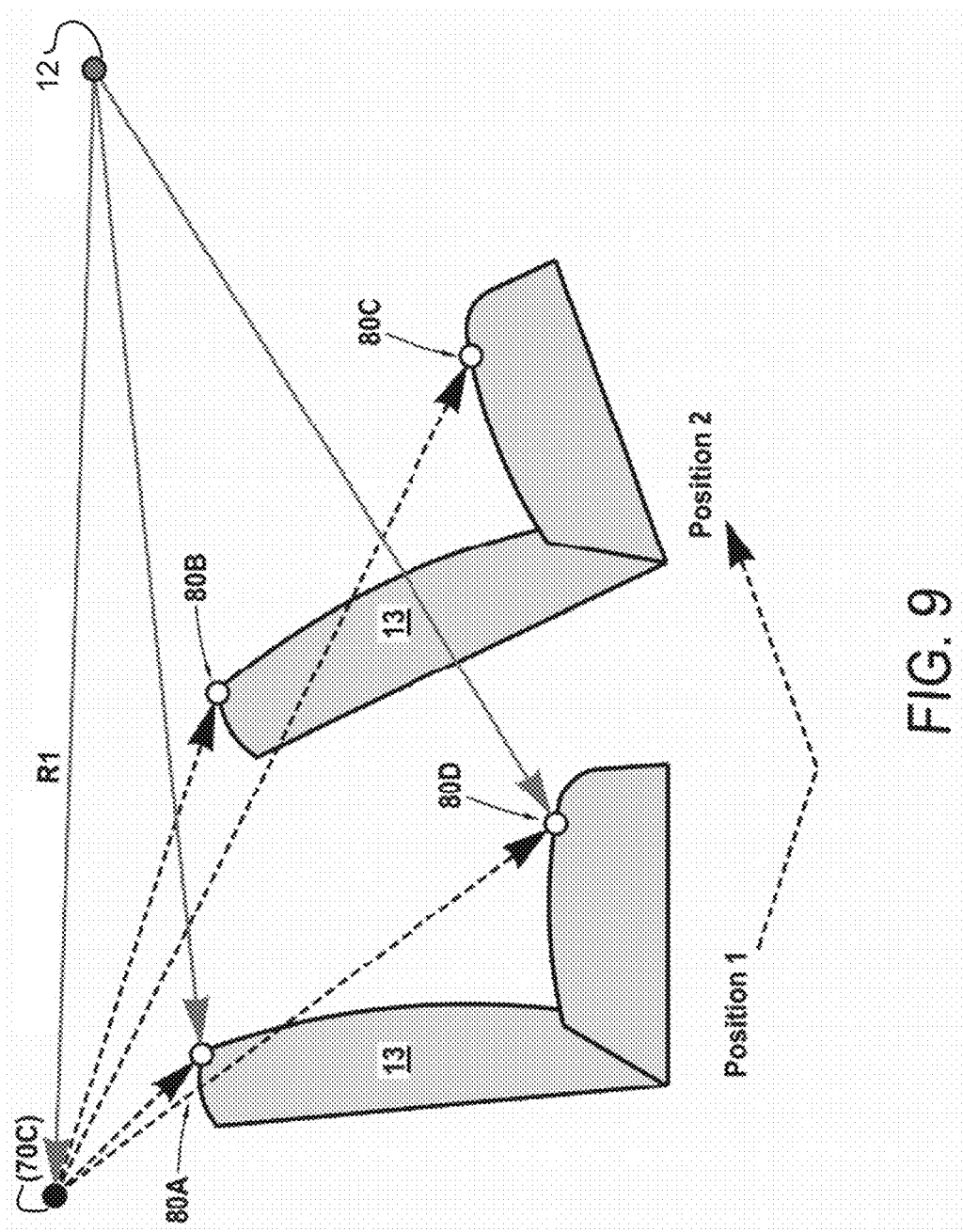
FIG. 9 is a schematic drawing showing an establishment of fixed reference points from otherwise dynamic structures in a vehicle.
Figure 10:
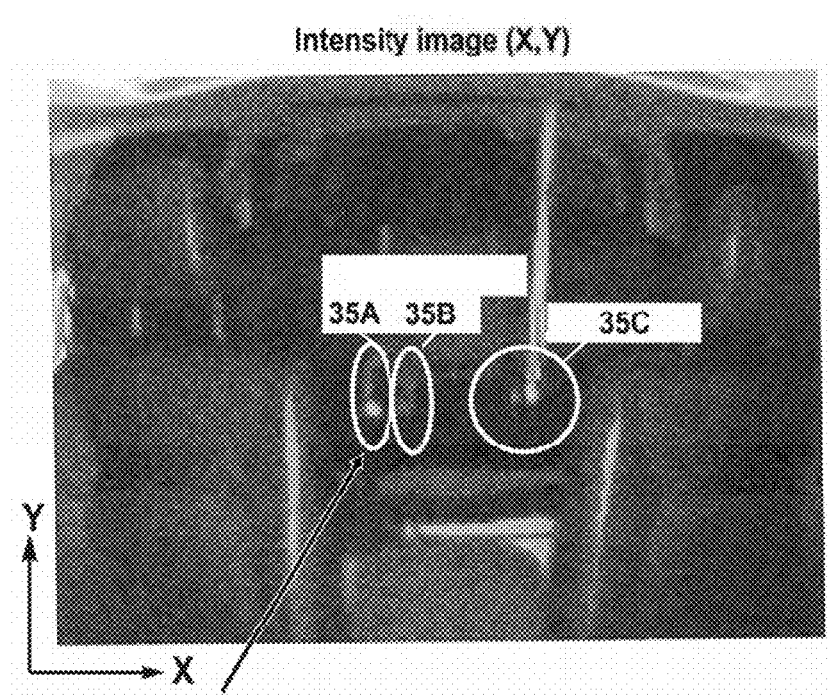
FIG. 10 is an intensity image captured with a vehicle interior camera as disclosed herein.

Setting up the fixed reference apertures (70) and their respective depth measurements (from fixed camera (12) location and payout aperture (30) location) allows the system to account for both fixed structures in the vehicle as well as dynamic (i.e., moving, or adjustable) structures in the vehicle. The fixed and dynamic structures can be used in measurement and motion analyses and still maintain a high confidence level in the image data. For example, and without limiting the disclosure in any way, a seat (13) in a vehicle may be movable along a track in a longitudinal direction (e.g., moving a driver's seat either away from or toward a steering wheel (19)) and have an angular range of motion for tilting both a seat back and a bottom cushion. FIG. 9 illustrates that a seat (13) installed in numerous vehicles includes at least two positions as shown (and most likely dozens more, given the adjustable structures that are common in seat assemblies). By identifying fixed reference apertures as points of reference (FIG. 8, Refs. 70A, 70B, 70C) within the vehicle interior (10), such as the above described payout apertures (30), a seat belt monitoring system can use the fixed reference points (70) as a point of origin to take additional measurements of vehicle components that are adjustable within a known range of motion. Also, fixed points of reference cannot move relative to the camera imager and can be designed with a fixed reflective intensity, noise removal algorithms utilizing the common noise components of light received from these fixed references can be applied to reduce reflective intensity and/or distance noise. FIG. 9 illustrates that a reference vector (R1) may be constructed as a part of the 3-D coordinate modeling for the vehicle interior. Accordingly, other reference points (80A-D) in an associated image may be identified, and distances from the first reference (70) can be established for other marked references that bear a reflective pattern as described above for FIGS. 1-6. Even when a vehicle structure such as a seat (13) has adjustable positions, the limited number of possible positions and the defined range of motion for the seat, or other adjustable structure in the vehicle, accommodates an identification as to which of the possible positions the structure has assumed in any one image.

Figure 11:
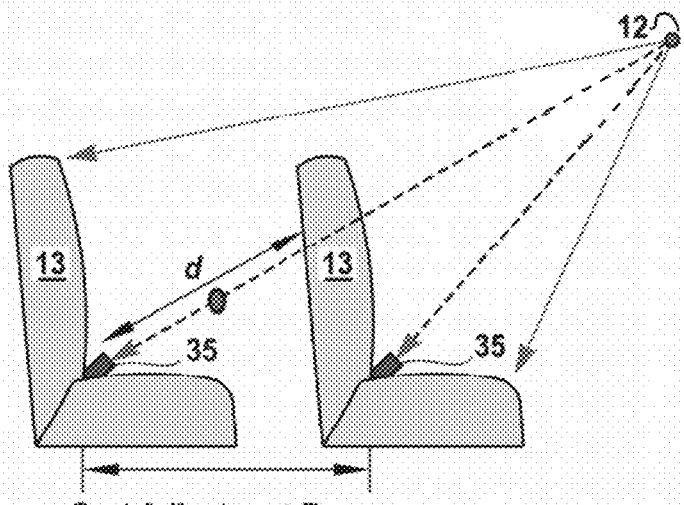
FIG. 11 is a schematic representation of a camera field of view that is adjustable within a vehicle interior as disclosed herein.
Figures 12, 13:
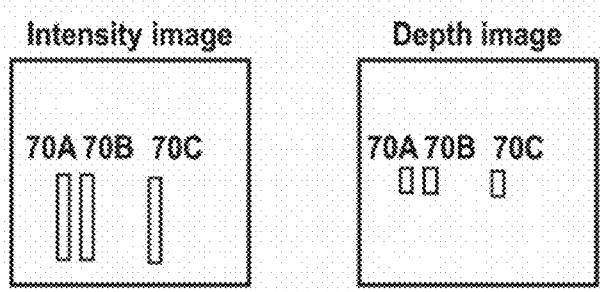
FIG. 12 is a schematic representation of an intensity image for a series of fixed reference points in a vehicle interior as disclosed herein.
FIG. 13 is schematic representation of a depth image for a series of fixed references points in vehicle interior as disclosed herein.
Figure 14:
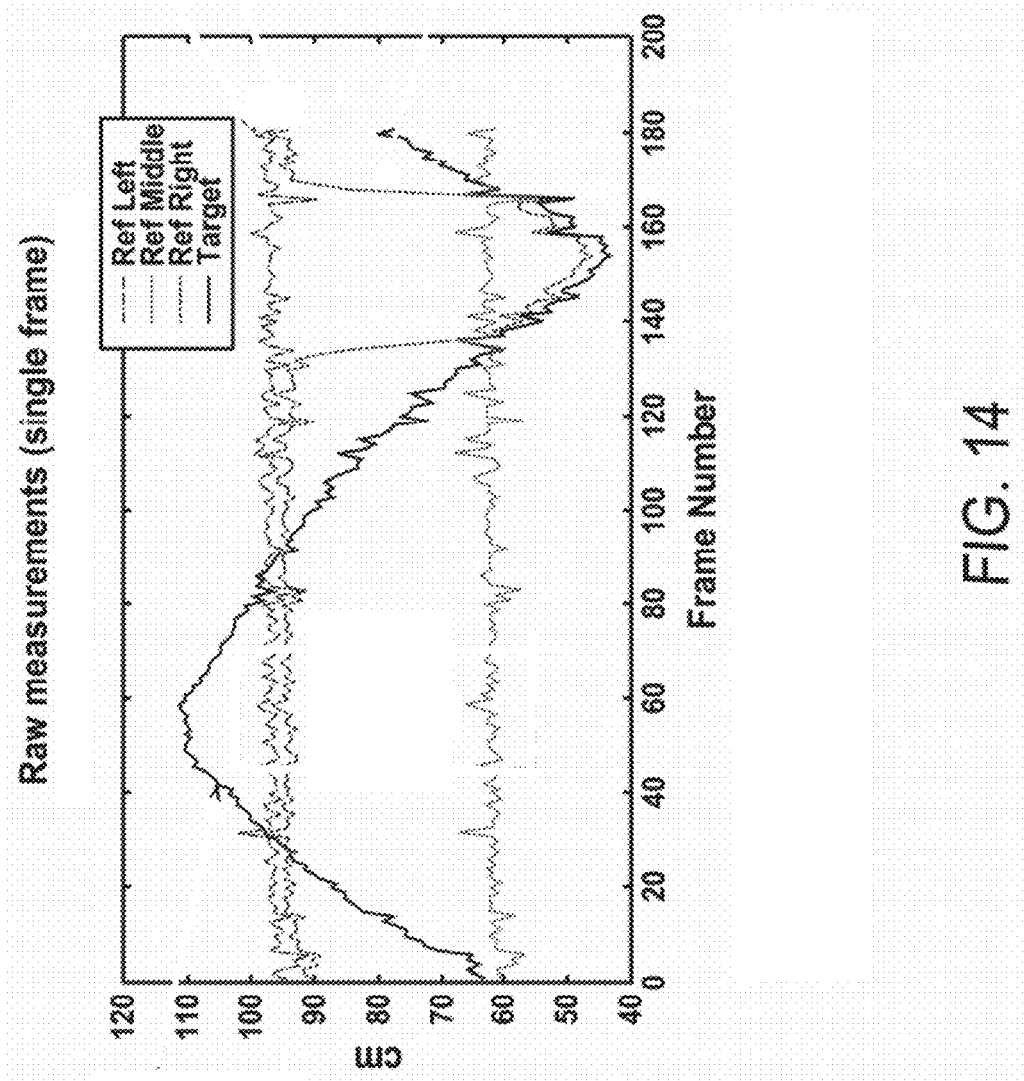
FIG. 14 is a schematic representation of a plot of image frames showing reference target distances in centimeters as captured by a camera according to the disclosure herein.
Figure 15:
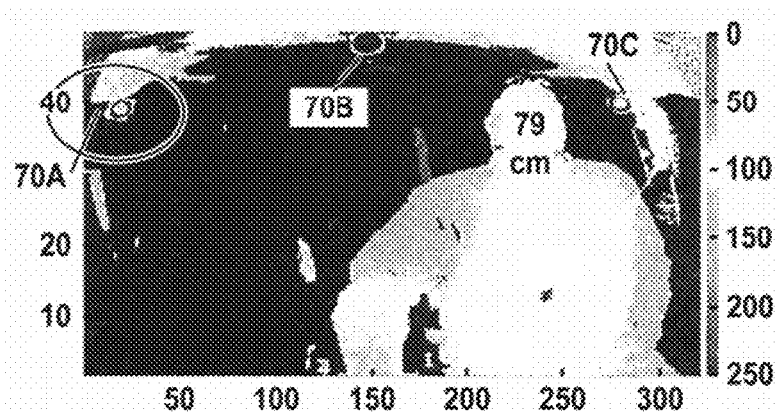
FIG. 15 is a two-dimensional reflected intensity and distance image illustrating an establishment of fixed reference points within a vehicle as shown in FIG. 9.
Figure 16:
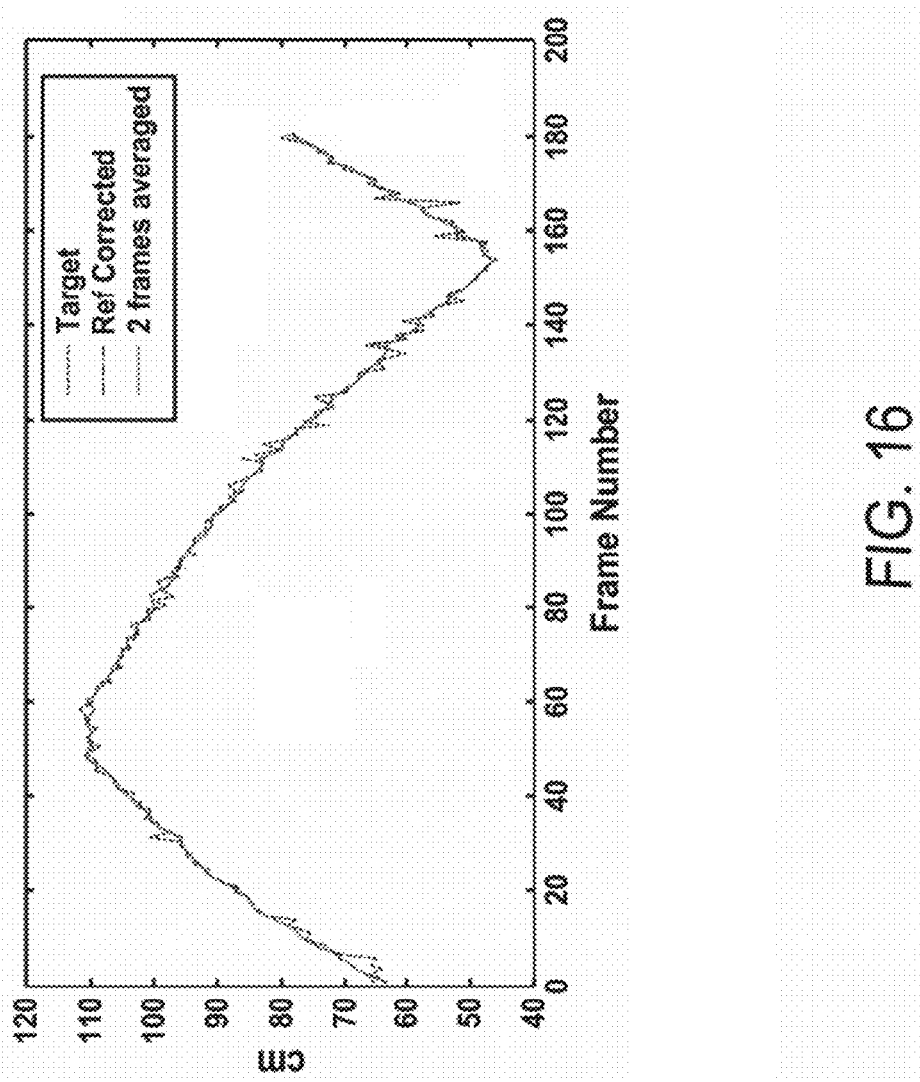
FIG. 16 shows a series of 3-D analyses for range accuracy of images acquired according to the disclosure herein.
Figure 17:
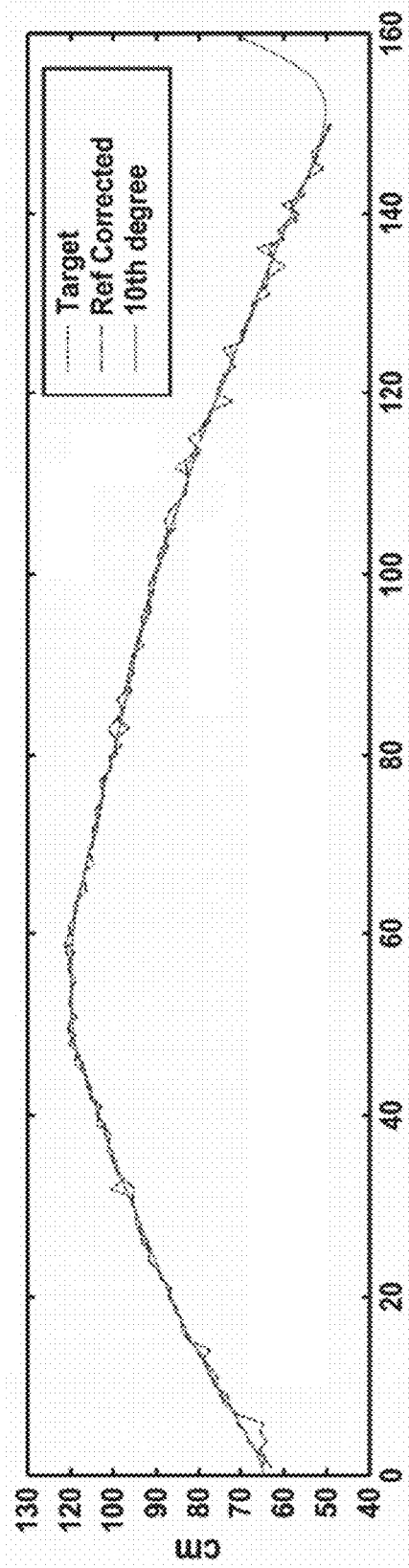
FIG. 17 shows a series of 3-D analyses of RMS error values associated with images acquired according to the disclosure herein.
Figure 18:
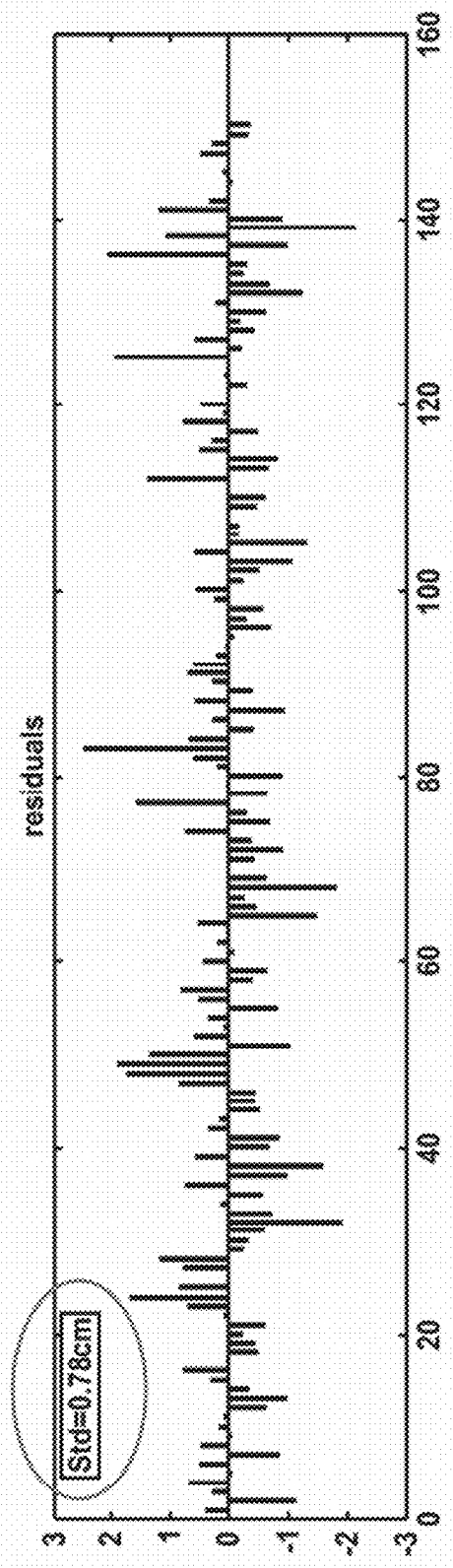
FIG. 18 shows a series of 3-D analyses of residual data for images acquired according to the disclosure herein.
Figure 19A:
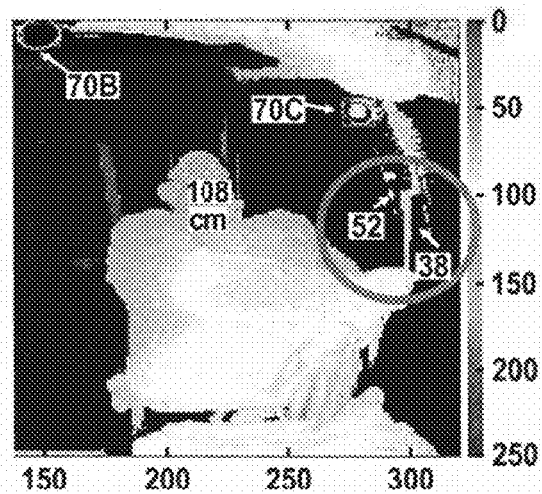
FIG. 19A is a first perspective view of a timed series of five images (A-E) illustrating tracked motion of a seat belt component utilizing fixed references as disclosed herein.
Figure 19B:
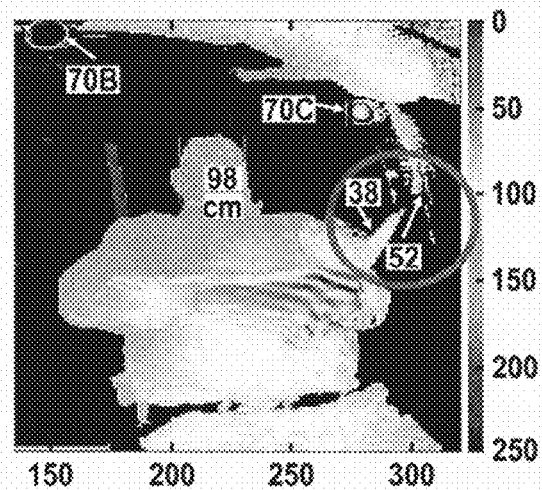
FIG. 19B is a second perspective view of a timed series of five images (A-E) illustrating tracked motion of a seat belt component utilizing fixed references as disclosed herein.
Figure 19C:
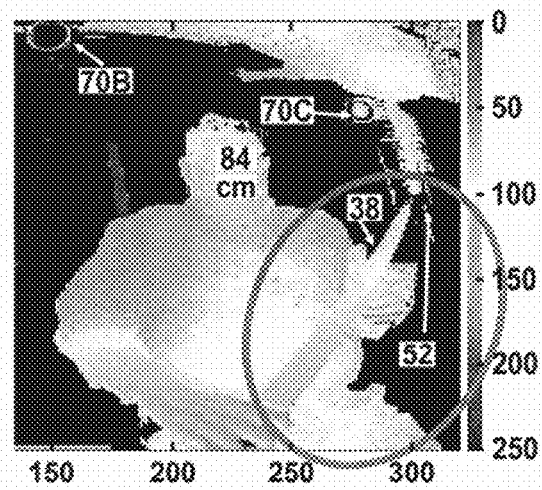
FIG. 19C is a third perspective view of a timed series time series of five images (A-E) illustrating tracked motion of a seat belt component utilizing fixed references as disclosed herein.
Figure 19D:
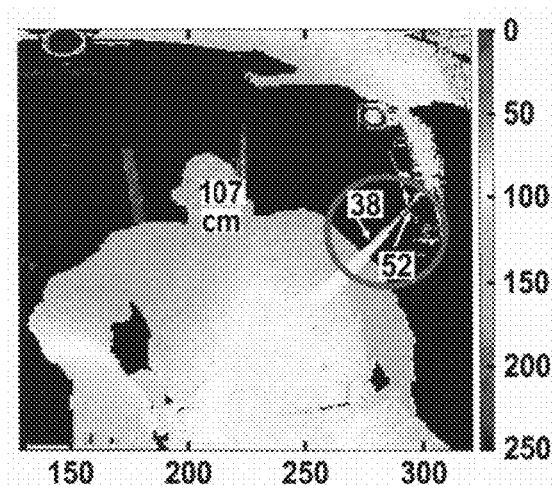
FIG. 19D is a fourth perspective view of a timed series of five images (A-E) illustrating tracked motion of a seat belt component utilizing fixed references as disclosed herein.
Figure 19E:
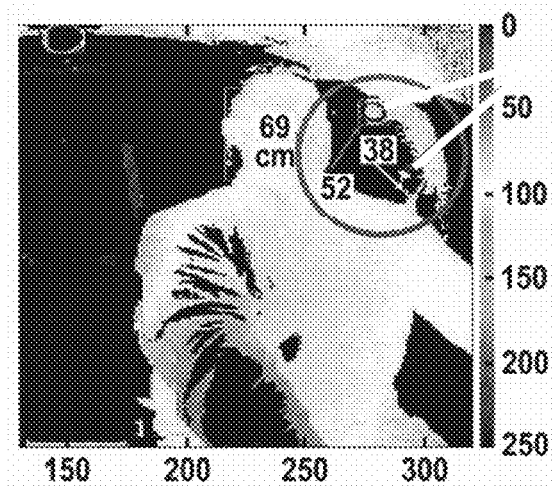
FIG. 19E is a fifth perspective view of a timed series of five images (A-E) illustrating tracked motion of a seat belt component utilizing fixed references as disclosed herein.
Figure 19F:
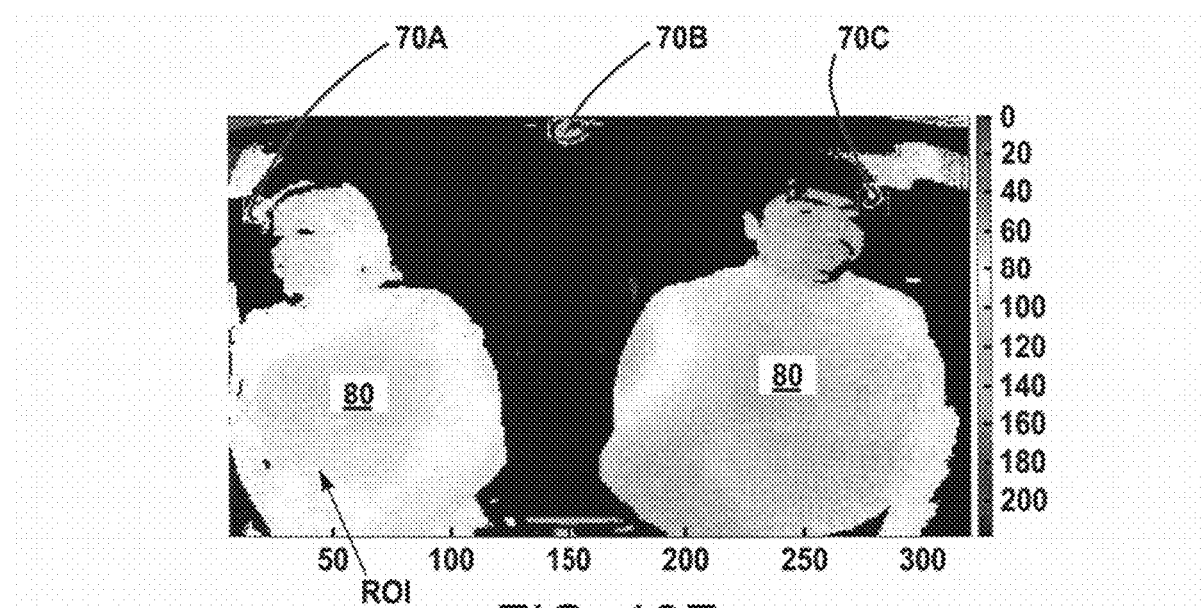
FIG. 19F is a sixth perspective view of a timed series of five images (A-E) illustrating tracked motion of a seat belt component utilizing fixed references as disclosed herein.
Figure 20:
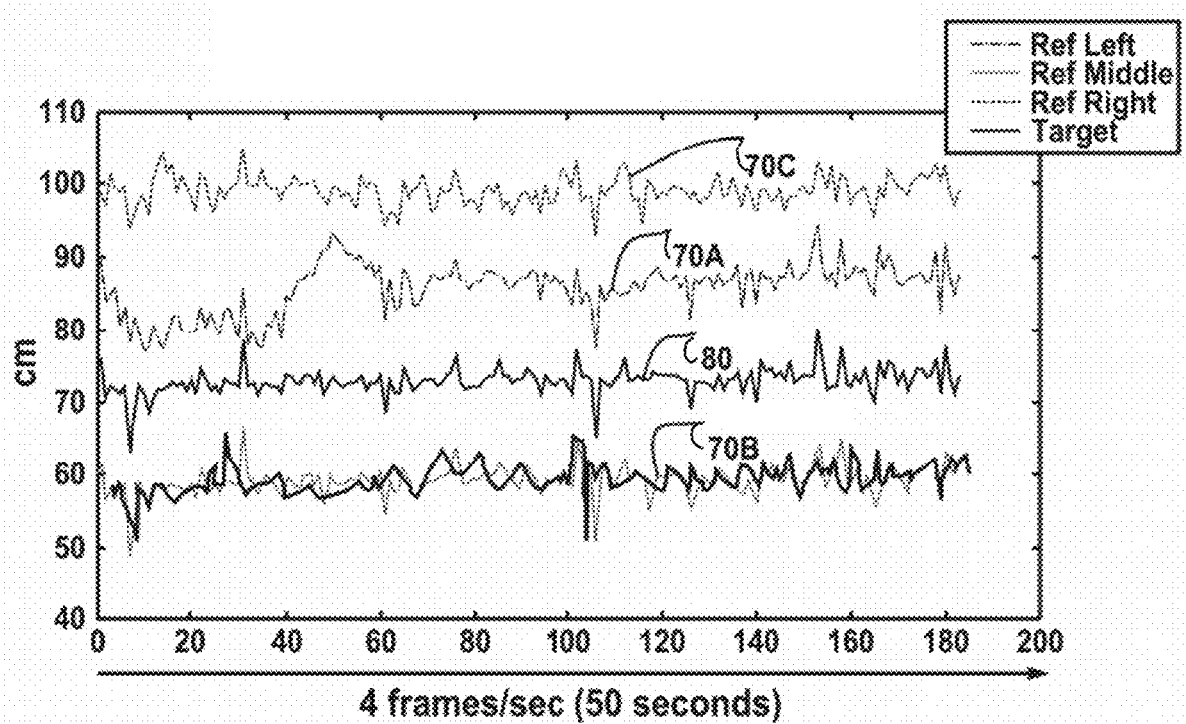
FIG. 20 is a plot of reference distance versus time for images acquired according to the disclosure of FIG. 19.
Figure 21:
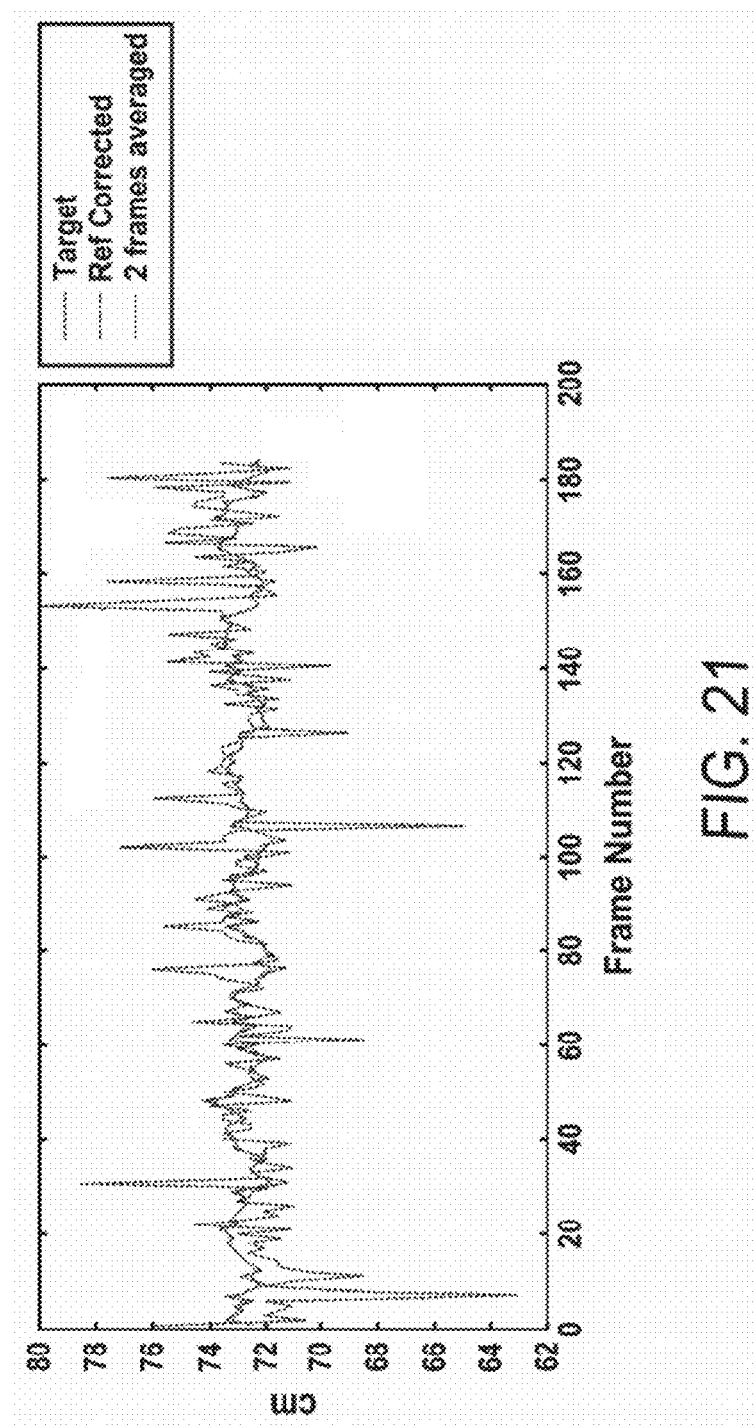
FIG. 21 is a plot of reference corrected and averaged signals for images acquired according to the disclosure of FIG. 19.
Figure 22:
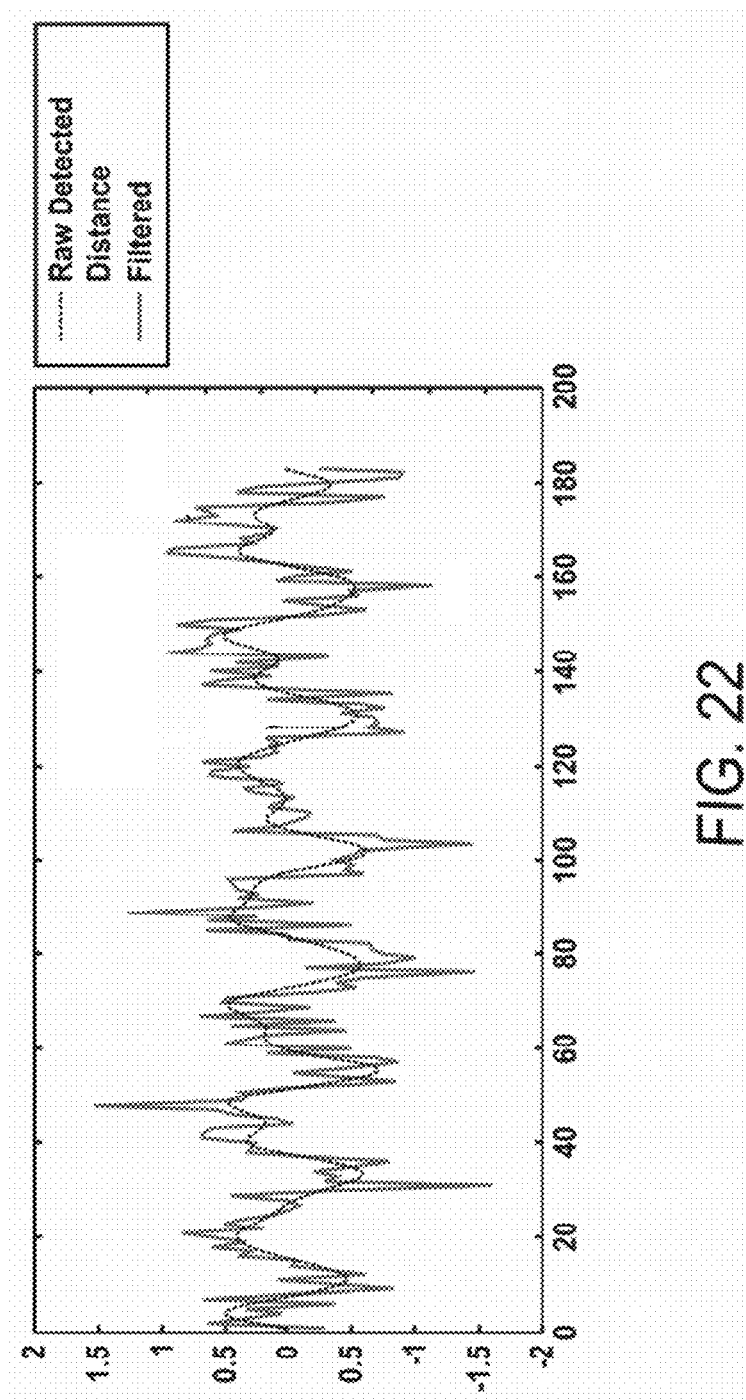
FIG. 22 is a plot of averaged signal and low pass filtered signals images acquired according to the disclosure of FIG. 19.
Figure 23:
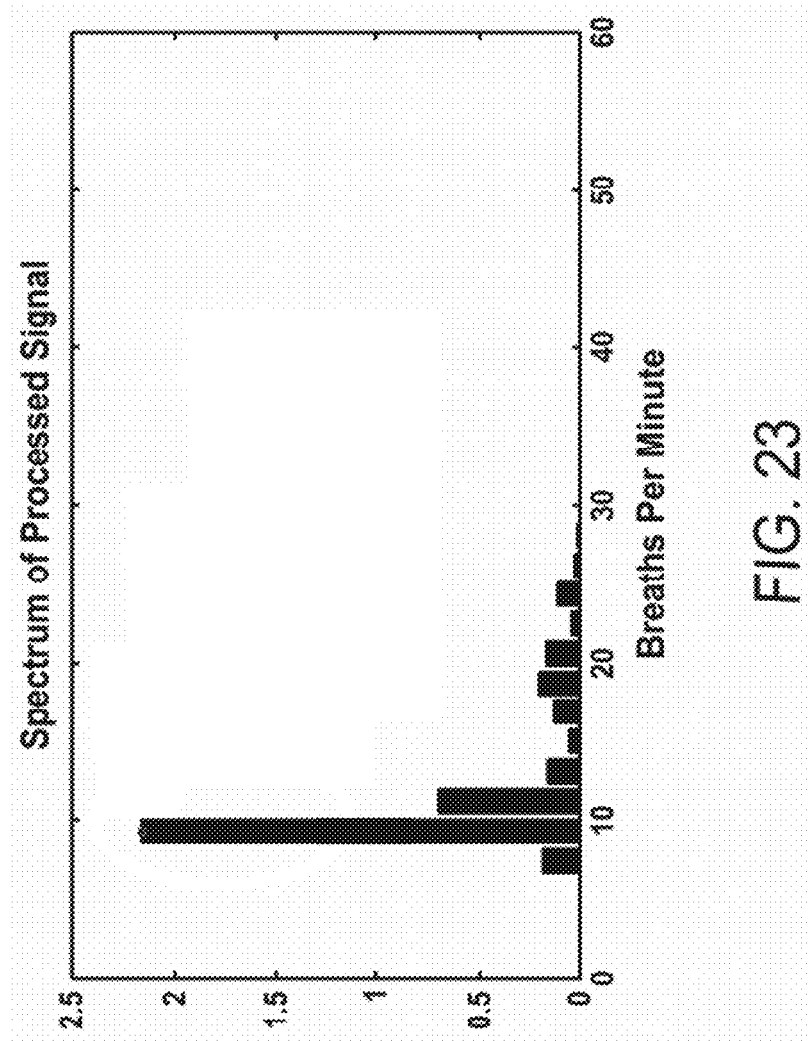
FIG. 23 show a series of 3-D analyses of images acquired according to the disclosure of FIG. 19.

With these known values established, the pattern recognition, 3-D reconstruction, spatial measurement and movement tracking methods are enabled for comparative analysis. FIGS. 10-13 illustrate this concept further in regard to a seat belt buckle (40) that has been fitted with the above described patterns for luminance and image analysis recognition. In FIG. 11, a camera (12) as described above includes the seats (13) and seat belt buckles (40) in the camera field of view. Even though the seat, and therefore the buckle as well, are dynamic components, their adjustable ranges are limited and known pursuant to OEM specifications. The computer program logic described herein, therefore, can determine with a high degree of certainty where various reference points on the dynamic structures are positioned within the vehicle at the time of any frame of a series of images. This procedure improves accuracy for both an occupant classification determination and seat belt monitoring as described above.

Without limiting this disclosure to any one particular analysis, FIGS. 13-18 and FIGS. 20-23 illustrate how the seat belt monitoring system and associated algorithms utilized by associated computers can show engineers, designers, and operators intricate trends in one dimensional, two dimensional, and three dimensional data formats. The embodiments of this disclosure also benefit from computer processing techniques implemented in computerized software that include programmed noise removal algorithms utilizing the common noise components of light received from the respective patterns.

The above-described disclosure has described apparatuses and techniques for (i) establishing identifiable patterns associated with a seat belt assembly and corresponding vehicle structures and (ii) providing imaging techniques that incorporate known reference values under numerous conditions, in regard to both fixed and dynamic structures within a vehicle. Structures in a vehicle may be either fixed or dynamic at different times. In one sense, certain components considered to be fixed in a vehicle include the fixed components of the seat belt assembly such as at least one of a webbing payout section (44) that defines a seat belt payout aperture, a seat belt buckle, a first anchor point for said seat belt buckle, a second anchor point for a lap strap portion of the seat belt assembly, and peripheral hardware connected to the fixed components. Dynamic components may include at least one of a seat belt extending from an aperture in a seat belt retractor, a shoulder strap portion of said seat belt, a lap belt portion of said seat belt, and a seat belt tongue because these items are likely to move during use and be in different positions from one occupant to another. Other components may have limited ranges of motion as described above (e.g., a seat or a seat belt buckle) so that while being adjustable in a dynamic sense, that same component can serve as a fixed component reference point if a selected position is known.

Using multiple cameras, multiple reference points, and properly placed patterns of distinct reflectivity accommodates a system that not only provides static spatial measurements of distances and angles, but also provides movement information for an occupant or a vehicle structure relative to a known or calculated reference point.

The iterative frames of FIG. 19 illustrate using these techniques for a time series motion analysis of an occupant interacting with a seat belt payout from a reference point (70) such as a seat belt payout aperture (30) having a predetermined pattern (52). With these reference points and associated measurements and images, the system is adapted to account for numerous occupant positions (i.e., lying down versus sitting normally) and adjust calculations for proper seat belt use accordingly. In one embodiment, the reference points (70) can be used with imaging analysis to identify a seat belt pattern showing seat belt slack across an occupant that is not suitable for proper and safe seat belt use.

Successive images from the at least one camera are analyzed to track occupant motion within a region of interest, wherein the motion is relative to at least one of the fixed components in the vehicle. Occupant motion data derived from the images is utilized by the processor to track occupant physiological processes, including but not limited to at least one of breathing, respiration rate, heart rate, mouth opening and closing, blinking, and speech patterns. Some of these measurements may be validated by the processor further calculating a seat position within the region of interest relative to the reference measurement of the fixed component.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, network device may be applicable in other exchanges or routing protocols. Moreover, although network device 102 has been illustrated with reference to particular elements and operations that facilitate the communication process, these elements, and operations may be replaced by any suitable architecture or process that achieves the intended functionality of network device.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. The structures shown in the accompanying figures are susceptible to 3-D modeling and can be described relative to vertical, longitudinal and lateral axes established with reference to neighboring components as necessary.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities may be implemented in software provisioned on networking device 102. In some embodiments, one or more of these features may be implemented in computer hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, computer systems described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term "processor."

The invention claimed is:

1. A system of evaluating seat belt assemblies installed in a vehicle, comprising:
    at least one camera connected to a computer system and at least one light source that illuminates regions of interest within a vehicle, wherein at least one region of interest is within the at least one camera's field of view;
    at least one seat belt assembly installed in the vehicle and positioned within the at least one camera field of view, said seat belt assembly comprising fixed components that are stationary in the vehicle and dynamic components that move within the vehicle, said fixed and dynamic components comprising respective patterns that each have a predetermined reflectivity,
    wherein the computer system comprises at least one processor connected to memory having computer implemented instructions thereon, the computer implemented instructions configured to:
    use the camera to generate at least one image of the at least one region of interest in the vehicle;
    identify at least one fixed component of the at least one seat belt assembly as a reference component within the image of the region of interest;
    calculate at least one reference measurement as the distance between the camera and an identified pattern in the image as reflected from the reference component;
    calculate respective spatial measurements of dynamic components of the seat belt assembly as captured in the image, wherein the respective spatial measurements of the dynamic components comprise distances between selected patterns reflected from the dynamic components as shown in the image and other structures within the vehicle also shown in the image; and
    compare the spatial measurements of the dynamic components of the seat belt assembly relative to the reference measurement to evaluate the seat belt assembly in the vehicle.

2. A system according to claim 1, wherein the fixed components of the seat belt assembly comprise at least one of a web payout section that defines a payout aperture; a seat belt buckle, a first anchor point for said seat belt buckle, a second anchor point for a lap strap portion of the seat belt assembly, and peripheral hardware connected to said fixed components.

3. A system according to claim 1, wherein said dynamic components comprise at least one of a seat belt extending from an aperture in a seat belt retractor, a shoulder strap portion of said seat belt, a lap belt portion of said seat belt, and a seat belt tongue.

4. A system according to claim 1, wherein multiple fixed components of the seat belt assembly are designated by the computer system as reference components in the image, and the computer implemented instructions are configured to measure spatial positions of points in the image relative to the reference components.

5. A system according to claim 4, wherein the reference measurement is a depth reference measurement and the respective spatial measurements are depth measurements of the respective patterns on dynamic components of the seat belt assembly as captured in the image.

6. A system according to claim 4, wherein the multiple fixed components comprise respectively distinct patterns having individualized reflectivity.

7. A system according to claim 1, wherein the system comprises at least two cameras each constructing images of the region of interest, and a pair of images comprises one image from each of the at least two cameras, wherein spatial measurements are taken across the pair of images and provide data to an occupant classification system connected to the computer system.

8. A system according to claim 7, wherein the occupant classification system comprises additional computerized instructions configuring the processor to detect body shapes, body edges, body depths, body dimensions, and body positions for occupants in the region of interest.

9. A system according to claim 8, wherein successive images from the at least two cameras are analyzed to track occupant motion within the region of interest, wherein said motion is relative to at least one of the fixed components in the vehicle.

10. A system according to claim 9, wherein occupant motion data derived from the images is utilized by the processor to track occupant physiological processes.

11. A system according to claim 10, wherein the physiological processes comprise at least one of breathing, mouth opening and closing, blinking, and speech.

12. A system according to claim 1, wherein the processor further calculates a seat position within the region of interest relative to the reference measurement of the fixed component.

13. A system according to claim 1, further comprising establishing a dynamic component of the seat belt assembly system as a second reference component, wherein the second reference component has a defined range of motion constrained to known positions, wherein the processor calculates the known position for the second reference component as captured in the image.

14. A system according to claim 13, wherein the processor calculates vectors from the second reference component to the camera as captured by the image to derive position information for the second reference component.

15. A system according to claim 14, wherein the second reference component comprises at least one of a point on a vehicle seat and a seat belt buckle connected to the vehicle seat such that the seat belt buckle has limited ranges of motion relative to the vehicle seat.

16. A system according to claim 1, wherein the camera constructs a sequence of images to compare and detect motion of at least one dynamic component of the seat belt assembly, wherein spatial measurements are taken across frames of the sequence to track use of a dynamic component in the vehicle.

17. A system according to claim 16, wherein the spatial measurements comprise depth measurements of a seat belt payout as the dynamic component relative to a payout aperture as the fixed component, and wherein said depth measurements track seat belt payout over an occupant torso.

18. A system according to claim 17, further comprising a buckle switch to provide the processor with a buckled/unbuckled signal to confirm seat belt use.

19. A system according to claim 16, wherein the processor uses the sequence of images to compare and detect motion of an occupant in the region of interest by comparing occupant position depth measurements relative to the reference component.

20. A system according to claim 19, wherein the processor uses the sequence of images to compare and detect depth measurements of a seat belt payout relative to a depth of a torso of the occupant, using the reference component for a known distance, and determining seat belt slack against the torso.

* * * * *